United States Patent

Kosik et al.

Patent Number: 6,035,984
Date of Patent: Mar. 14, 2000

[54] AUTOMATIC CLUTCH

[75] Inventors: Franz Kosik, Ostfildern; Thomas Grass, Urbach, both of Germany

[73] Assignee: DaimlerChrysler AG, Stuttgart, Germany

[21] Appl. No.: 09/230,046

[22] PCT Filed: Jul. 2, 1997

[86] PCT No.: PCT/EP97/03485

§ 371 Date: May 18, 1999

§ 102(e) Date: May 18, 1999

[87] PCT Pub. No.: WO98/03800

PCT Pub. Date: Jan. 29, 1998

[30] Foreign Application Priority Data

Jul. 17, 1996 [DE] Germany .................. 196 28 789

[51] Int. Cl.[7] ........................................ F16D 48/06
[52] U.S. Cl. ............... 192/3.61; 192/30 W; 192/103 R; 701/67
[58] Field of Search ................. 192/3.61, 30 W, 192/103 R; 477/176; 701/67

[56] References Cited

U.S. PATENT DOCUMENTS

| | | |
|---|---|---|
| 4,651,142 | 3/1987 | Klatt . |
| 4,660,697 | 4/1987 | Yoneda et al. .......... 192/103 R X |
| 5,190,130 | 3/1993 | Thomas et al. . |
| 5,322,150 | 6/1994 | Schmidt-Brücken et al. . |
| 5,403,249 | 4/1995 | Slicker ........................ 477/176 |
| 5,704,872 | 1/1998 | Kosik et al. ................ 477/176 X |

FOREIGN PATENT DOCUMENTS

| | | |
|---|---|---|
| 0137247 | 4/1985 | European Pat. Off. . |
| 0494608 | 7/1992 | European Pat. Off. . |
| 90/05866 | 5/1990 | WIPO . |

*Primary Examiner*—Richard M. Lorence
*Attorney, Agent, or Firm*—Evenson, McKeown, Edwards & Lenahan, P.L.L.C.

[57] ABSTRACT

This invention relates to an automatically controlled clutch in a motor vehicle drive train. Rotational speed differences between the clutch input and the clutch output are determined by a computer from rotational speeds of the vehicle engine, on the one hand, and rotational speeds of the vehicle drive wheels, on the other hand. Variations of a frequency which is characteristic of resonant frequencies in the drive train when the clutch is closed are not taken into account.

10 Claims, 1 Drawing Sheet

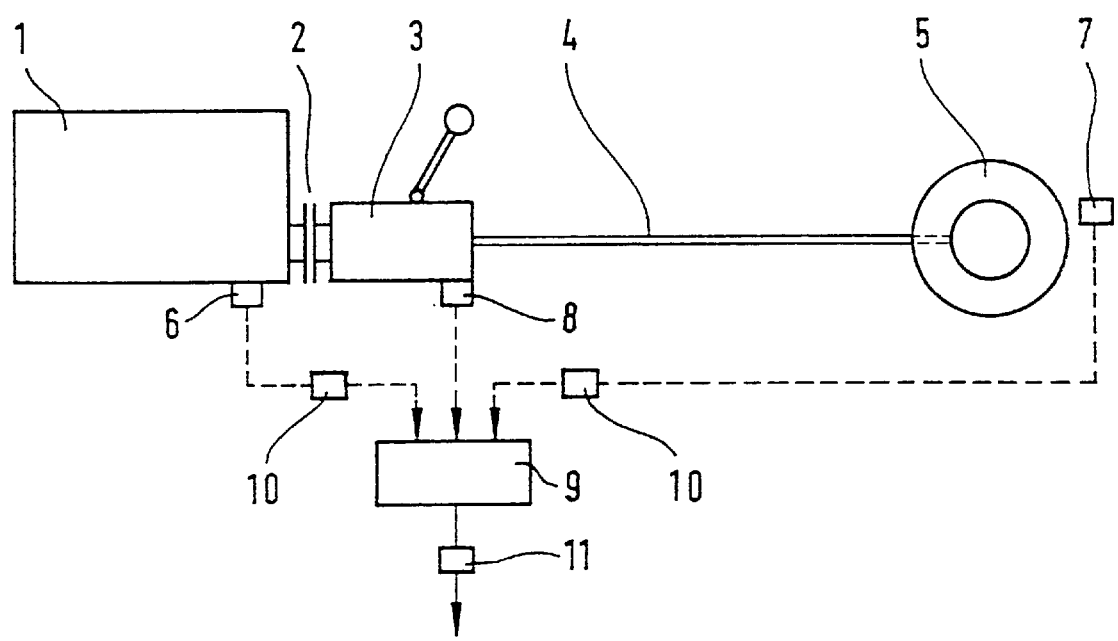

AUTOMATIC CLUTCH

BACKGROUND AND SUMMARY OF THE INVENTION

This invention relates to an automatically controlled clutch between an engine and a drive train of a motor vehicle, having a monitoring device which records rotational speed differences between the clutch input and the clutch output.

Motor vehicles with manually shifted transmissions and an automatically controlled clutch are basically known.

When controlling the automatic clutch and when monitoring the clutch, it is, in principle, desirable to detect rotational speed differences between the clutch input and the clutch output. This facilitates a no-jolt engaging and disengaging of the clutch and also permits detection of the thermal stress on the automatic clutch without measuring the temperature, since a computer simulation is carried out by which temperature conditions at the clutch are computed from the rotational speed difference, from the respectively transmitted clutch torque which is detected by corresponding sensors, and from the time history of the rotational difference and the clutch torque. The fact that the thermal dissipation losses occurring at the clutch are proportional to the product of the coupling torque and the rotational speed difference is utilized in this case.

It is an object of the invention to detect the rotational speed differences between the clutch input and the clutch output at low expenditures.

According to the invention, this object is achieved by determining the above-mentioned rotational speed differences from the signals of a first rotational speed measuring arrangement at the clutch input or non-rotatably connected on the vehicle engine as well as from the signals of another rotational speed generator arrangement on drive wheels of the vehicle, taking into account the respective ratio or position of a transmission between the clutch and the drive wheels, but while fading out rotational speed variations with a frequency which corresponds to a resonant frequency of the drive train when the clutch is closed.

The present invention is based on the general idea of using such rotational speed measuring arrangements which must exist in the vehicle anyhow for determining the rotational speed differences between the clutch input and the clutch output. The first rotational speed measuring arrangement is required in the case of modern motor vehicle combustion engines which are controlled with the goal of minimizing harmful exhaust gases. The second rotational speed measuring arrangement is always required for braking systems of a vehicle having an anti-lock system or control (ABS). The transmission ratios between the rotational speeds of the clutch output and the drive wheels are constructively defined. It may only be necessary to detect which transmission position or which gear is engaged. This is necessary or desirable anyhow for optimal control of the clutch torque when the clutch is engaged and disengaged.

Furthermore, the invention takes into account the recognition that, when the clutch is closed, characteristic bucking vibrations occur in the drive train, with the result that the ratio between the rotational speeds of the vehicle engine and the rotational speeds of the drive wheels of the vehicle fluctuates at a characteristic frequency of, for example, 4 to 5 Hz. The frequency of these bucking vibrations, which occur when the clutch is closed, is clearly lower than the frequency of grabbing vibrations occurring when the clutch is engaged or disengaged when the clutch is still slipping; that is, the clutch torque is still lower than the torque effective between vehicle engine and the drive train. Therefore, in comparison to the bucking vibrations, the grabbing vibrations have a clearly higher frequency which is increased approximately by a factor of 2 because, as a result of the not-yet closed clutch, the moments of inertia of the engine cannot be frequency-determining for the grabbing vibrations in the drive train.

In the present invention, the bucking vibrations are "faded out" during the analysis of the rotational speed differences between the engine and the drive train. It follows that an analogously fluctuating rotational speed difference between the clutch input and the clutch output from corresponding vibrations of the rotational speeds of the engine and the drive wheels, and therefore determination of an erroneous slipping clutch condition, is prevented.

As a result, the invention also makes it possible, in the case of extremely elastically flexible drive trains, to draw a conclusion from the signals for the rotational engine speed as well as the rotational wheel speed in a manner which is not falsified by bucking vibrations with respect to rotational speed differences between the clutch input and the clutch output.

As required, without being disturbed by bucking vibrations, the function of one of the sensors detecting the clutch torque can be examined in that it is sensed whether simultaneously disappearing rotational speed differences between the clutch input and the clutch output and a sufficiently large clutch moment exist in the case of which the clutch would have to operate without slip.

In addition, with respect to preferred characteristics of the invention, reference is made to the claims as well as to the following explanation of the drawing by means of which a particularly advantageous embodiment is described.

BRIEF DESCRIPTION OF THE DRAWINGS

The single FIGURE is a schematic representation of a drive train as well as of a pertaining engine of a motor vehicle.

DESCRIPTION OF THE PREFERRED EMBODIMENT

A basically conventional internal-combustion engine 1, which is used for driving a motor vehicle not shown in detail, can be connected by way of an automatically controlled clutch 2 as well as a manually shifted transmission 3 and a drive shaft 4 (cardan shaft) with respect to the drive with drive wheels 5.

A first rotational speed measuring arrangement 6 is assigned to the engine 1, and a second rotational speed measuring arrangement 7 is assigned to the drive wheels 5. By means of a sensor 8 on the transmission 3, the respectively engaged transmission position and thus the (mathematical) transmission ratio between the output of the clutch 2 and the drive wheels 5 are detected.

Because of the typically non-rotatable driving connection between the engine 1 and the input of the clutch 2, the rotational engine speed, in a reversible manner, clearly corresponds to the rotational speed of the clutch input. The signals of the rotational speed measuring arrangement 6 therefore also indicate the rotational speed of the input of the clutch 2.

From the rotational wheel speeds determined by the rotational speed measuring arrangement 7, the rotational speed of the output of the clutch 2 can be precisely determined only when the clutch is opened up, provided that the engaged transmission position in each case determined by the sensor 8 or the thus defined transmission ratio between the output of the clutch 2 and the drive wheels 5 is taken into account. As soon as the clutch 2 is closed and the drive train between the transmission 3 and the drive wheels 5 is stressed by higher transmitted torques, because of constructively defined and, as a rule, also desired higher elasticities of the drive train, larger differences may occur between the actual rotational speeds of the output of the clutch 2 and the rotational speeds of the clutch output mathematically determined on the basis of the rotational speeds of the drive wheels 5 because the drive train may be considerably torqued.

When the clutch 2 is closed, these differences between the calculated and the actual rotational speed of the clutch output fluctuate at a characteristic bucking frequency which is defined by the respective dimensions of the drive train or of the vehicle as well as the engine. Such a characteristic bucking frequency is, for example, approximately 4 Hz.

If the rotational movements of the drive wheels 5 caused by such bucking vibrations relative to the output of the clutch 2 are prevented from having a reaction on the value of the determined rotational speed difference between the input and the output of the clutch 2, then the actual rotational speed differences between the input and the output of the clutch 2 can be determined sufficiently precisely from the rotational speeds of the engine 1 and the drive wheels 6.

According to the invention, for this purpose, a computer 9 first determines a value for the rotational speeds of the input of the clutch 2 from the signals of the rotational speed measuring arrangement 6 and determines a value for the rotational speeds of the output of the clutch 2 from the signals of the rotational speed measuring arrangement 7 and of the sensor 8 as if, as the result of the respective engaged transmission position, a fixed rotational speed ratio were also given between the output of the clutch 2 and the drive wheels 5. A difference is determined from these rotational speed values, in which case variations of the value of the difference can be eliminated with the frequency which is characteristic of bucking vibrations of the drive train.

This can, for example, take place by having the computer examine whether the preceding sign of the determined difference constantly changes at a frequency to be expected because of the bucking frequency or whether the value of the determined rotational speed difference crosses over through the 0 value at a frequency to be expected on the basis of the bucking frequency. If the bucking frequency has the value $f_R$, then the following applies to the number A of the preceding sign change or of the zero crossover within a time interval t:

$$A=2f_R t.$$

It is also possible and advantageous to connect respective filters 10 between the computer 9 and the rotational speed measuring arrangements 6 and 7, which filters 10 are impervious to a narrow frequency band surrounding the bucking frequency. As a result, the computer 9 receives only those rotational speed signals which are filtered with respect to signal variations at the bucking frequency.

Basically, it is also possible to arrange a filter 11 on the output side of the computer 9 instead of the filters 10 arranged on the input side of the computer; such a filter 11 is also impervious to signal variations at the bucking frequency. This results in that only those signals still present on the output side of the filter 11 which represent rotational speed differences have variations at the bucking frequency which are filtered.

The frequency of the bucking vibrations changes slightly with the loading of the vehicle. For this reason, when the filters 10 and 11 are dimensioned, a corresponding frequency band must be taken into account within which the filters are impervious. Correspondingly, a frequency band must also be taken into account when determining the number A of the preceding sign changes or of the zero crossovers.

In the case of driving conditions in which a closed clutch 2 can be assumed, the respective frequency of the bucking vibrations can be determined very precisely so that the frequency band can be adaptively limited to the measured value of the bucking frequency after a fairly short drive after the start of the vehicle.

We claim:

1. Automatically controlled clutch between an engine and a drive train of a motor vehicle, comprising:
   a monitoring device which records rotational speed differences between a clutch input and a clutch output,
   a first rotational speed measuring arrangement, and
   another rotational speed measuring arrangement,
   the rotational speed differences being determined from signals of said first rotational speed measuring arrangement at the input of the clutch or at the vehicle engine non-rotatably connected with the input as well as signals of the other rotational speed measuring arrangement on vehicle drive wheels while taking into account a respective ratio or position of a transmission between the clutch and the drive wheels and while fading out rotational speed variations with a frequency which corresponds to a resonant frequency of the drive train when the clutch is closed.

2. Automatically controlled clutch according to claim 1, wherein a conclusion is drawn with respect to a disappearing rotational speed difference between the clutch input and the clutch output when said difference, which is a difference between a value for an input-side rotational speed on the clutch, which is determined from the signals of the first rotational speed measuring arrangement, and a value for an output-side rotational speed on the clutch, which is determined from the signals of the other rotational speed measuring arrangement as well as of the respective ratio, changes its preceding sign at a frequency to be expected for vibrations at the resonant frequency.

3. Automatically controlled clutch according to claim 1, and further comprising at least one filter which is impervious to signal variations at the resonant frequency and is arranged on at least one of an input side and an output side of a computer interacting with the first and the other rotational speed measuring arrangements.

4. Automatically controlled clutch according to claim 1, wherein a conclusion is drawn with respect to a disappearing rotational speed difference between the clutch input and the clutch output when said difference, which is a difference between a value for an input-side rotational speed on the clutch, which is determined from the signals of the first rotational speed measuring arrangement, and a value for an output-side rotational speed on the clutch, which is determined from the signals of the other rotational speed measuring arrangement as well as of the respective ratio, crosses over through the 0 value at a frequency to be expected for vibrations at the resonant frequency.

5. Automatically controlled clutch according to claim 1, wherein a conclusion is drawn with respect to a disappearing rotational speed difference between the clutch input and the clutch output when said difference, which is a difference between a value for an input-side rotational speed on the clutch, which is determined from the signals of the first rotational speed measuring arrangement, and a value for an output-side rotational speed on the clutch, which is determined from the signals of the other rotational speed measuring arrangement as well as of the respective ratio, changes its preceding sign and crosses over through the 0 value at a frequency to be expected for vibrations at the resonant frequency.

6. Automatically controlled clutch between an engine and a drive train of a motor vehicle, comprising:

a monitoring device which records rotational speed differences between a clutch input and a clutch output, a first rotational speed measuring arrangement, and another rotational speed measuring arrangement, the rotational speed differences being determined from signals of said first rotational speed measuring arrangement at the input of the clutch or at the vehicle engine non-rotatably connected with the input as well as signals of the other rotational speed measuring arrangement arranged on an output side of the clutch while fading out rotational speed variations with a frequency which corresponds to a resonant frequency of the drive train, wherein the other rotational speed measuring arrangement detects rotational speeds of vehicle drive wheels and the rotational speed differences between the clutch input and the clutch output are determined while taking into account a respective ratio or position of a transmission between the clutch and the vehicle drive wheels and while fading out a resonant frequency of the drive train occurring when the clutch is closed.

7. Automatically controlled clutch according to claim 6, wherein a conclusion is drawn with respect to a disappearing rotational speed difference between the clutch input and the clutch output when said difference, which is a difference between a value for an input-side rotational speed on the clutch, which is determined from the signals of the first rotational speed measuring arrangement, and a value for an output-side rotational speed on the clutch, which is determined from the signals of the other rotational speed measuring arrangement as well as of the respective ratio, changes its preceding sign at a frequency to be expected for vibrations at the resonant frequency.

8. Automatically controlled clutch according to claim 6, and further comprising at least one filter which is impervious to signal variations at the resonant frequency and is arranged on at least one of an input side and an output side of a computer interacting with the first and the other rotational speed measuring arrangements.

9. Automatically controlled clutch according to claim 6, wherein a conclusion is drawn with respect to a disappearing rotational speed difference between the clutch input and the clutch output when said difference, which is a difference between a value for an input-side rotational speed on the clutch, which is determined from the signals of the first rotational speed measuring arrangement, and a value for an output-side rotational speed on the clutch, which is determined from the signals of the other rotational speed measuring arrangement as well as of the respective ratio, crosses over through the 0 value at a frequency to be expected for vibrations at the resonant frequency.

10. Automatically controlled clutch according to claim 6, wherein a conclusion is drawn with respect to a disappearing rotational speed difference between the clutch input and the clutch output when said difference, which is a difference between a value for an input-side rotational speed on the clutch, which is determined from the signals of the first rotational speed measuring arrangement, and a value for an output-side rotational speed on the clutch, which is determined from the signals of the other rotational speed measuring arrangement as well as of the respective ratio, changes its preceding sign and crosses over through the 0 value at a frequency to be expected for vibrations at the resonant frequency.

* * * * *